United States Patent [19]

Larson

[11] Patent Number: 5,786,562

[45] Date of Patent: Jul. 28, 1998

[54] METHOD AND DEVICE FOR PRODUCING THREE-DIMENSIONAL BODIES

[75] Inventor: Ralf Larson, Svenshögen, Sweden

[73] Assignee: Arcam Limited, London, United Kingdom

[21] Appl. No.: 549,687

[22] PCT Filed: May 11, 1994

[86] PCT No.: PCT/SE94/00442

§ 371 Date: Nov. 9, 1995

§ 102(e) Date: Nov. 9, 1995

[87] PCT Pub. No.: WO94/26446

PCT Pub. Date: Nov. 24, 1994

[30] Foreign Application Priority Data

May 12, 1993 [SE] Sweden ................................ 9301647

[51] Int. Cl.[6] .................................................. B32K 9/00
[52] U.S. Cl. ................................ 219/137 R; 219/76.12
[58] Field of Search ........................... 219/76.15, 76.1, 219/76.12, 76.13, 137 R; 156/58, 62.2

[56] References Cited

U.S. PATENT DOCUMENTS

| 3,670,137 | 6/1972 | Inoue | 219/76.13 |
| 4,863,538 | 9/1989 | Deckard | 156/62.2 |
| 5,354,414 | 10/1994 | Feygin | 156/58 |

FOREIGN PATENT DOCUMENTS

| 0 289 116 | 11/1988 | European Pat. Off. |
| 34 30 114 | 2/1986 | Germany . |
| WO 88/02677 | 4/1988 | WIPO . |
| WO 90/15375 | 12/1990 | WIPO . |

OTHER PUBLICATIONS

"From Computer to Component in 15 Minutes: The Integrated Manufacture of Three–Dimensional Objects", Marcus, et al., JOM, No. 4, Apr. 1990, pp. 8–11.

*Primary Examiner*—Clifford C. Shaw
*Attorney, Agent, or Firm*—Merchant, Gould, Smith, Edell, Welter & Schmidt

[57] ABSTRACT

Method to create three-dimensional bodies (30), for example models, formers, finished products, semi-finished products, among others, from a medium (12) consisting of particles, by producing a number of cross-sectional layers (25), each and every one representing a cross section of an object that has to be manufactured, whereby by means of an energy producing device (22a), which moves over the medium, the particles, in the just then topmost layer, in chosen areas, are connected at least with each other or with each other and with a preceding layer, in accordance with signals from a control unit (20). Particles that are no connected in respective layers are removed. The energy producing device (22a), which comprises at least one electrode (22b), forms one of the poles in a circuit, where the other pole is constituted of said medium (12), which is electrically conducting or semi-conducting when these poles are connected to at least a voltage source (40), whereby energy waves are formed between said electrode and said medium (12), for example in form of at least an electric arc or heat, that connect the material particles of said medium by changing the physical characteristics of said particles in said chosen area (25).

32 Claims, 5 Drawing Sheets

METHOD AND DEVICE FOR PRODUCING THREE-DIMENSIONAL BODIES

The present invention refers to a method and a device for creating three-dimensional bodies, for example models, formers, finished products, semi-finished products, among others, by producing a number of cross-sectional layers of an object, that has to be manufactured, whereby by means of an energy producing device, which moves over the medium, chosen areas of the medium are bound together in its topmost layer in accordance with signals from a control unit.

BACKGROUND OF THE INVENTION

During design work, visualization and sometimes physical representation of the three-dimensional geometries of the element that is building up, are desired. Such visualization is required in particular when working with CAD (Computer Aided Design), by which computed information can be used directly and without human intervention in the manufacturing process (CAM: Computer Aided Manufacturing). The costs for errors in connection with manufacturing rise if an error appears in the design, the error being transmitted to the automatically manufactured product.

In complex three-dimensional geometries, for example the cylinder heads in a combustion engine, the assembly of several interacting parts in a complex device, for example parts in an engine, early access to physical models and prototypes in a construction process is in most cases required to be able to carry out the real construction.

Big companies most often have their own departments for manufacturing models and prototypes. Smaller companies turn to special model producers for manufacturing prototypes or, because of high costs, manufacture new products without making any prototype.

In most cases, it is important to produce a model to be able to see details, fits and even to use the model for marketing purpose before finished products are manufactured.

Today's prototype manufacturing processes are frequently time consuming and costly.

The international application Wo 88/02677 discloses a method and apparatus for selectively sintering a layer of powder to produce a part comprising a plurality of sintered layers. In the apparatus, a laser beam is used, which, by means of control signals from a control unit, scans over the container holding the material that has to be sintered, i.e. the material fuses by means of a laser beam where it is hit by the beam. After each sintering step, new material is transferred for the next sintering step. Each sintered layer represents, for example, a layer in a computer generated model. Since laser technique is used for producing the model, the costs are high.

Through DE-Al-3 430 114, a device for producing three-dimensional models is known. This device uses a welding set, that welds together layers of welding threads to produce a model. The manufacturing is time consuming, has a bad resolution and cavities or the like are difficult to produce.

OBJECT OF THE INVENTION

The object of the present invention is to produce a device for cost-effectively and quick manufacturing models, prototypes or finished products. The device shall even be able to use many different kinds of material for manufacturing the model/product.

This object is achieved by means of the energy producing device, which comprises at least one electrode, forming one

2 of the poles in a circuit, where the other pole is constituted of said medium, which is electrically conducting or semi-conducting when these poles are connected to at least a voltage source, whereby energy waves are formed between the electrode and the medium, for example in form of at least an electric arc or heat, that connect the material particles of the medium by changing the physical characteristics of the particles in the chosen area.

DESCRIPTION OF THE DRAWINGS

The invention will be more clearly described hereinbelow with reference to the embodiments shown on the accompanying drawings.

DESCRIPTION OF THE EMBODIMENTS

Figure 1:
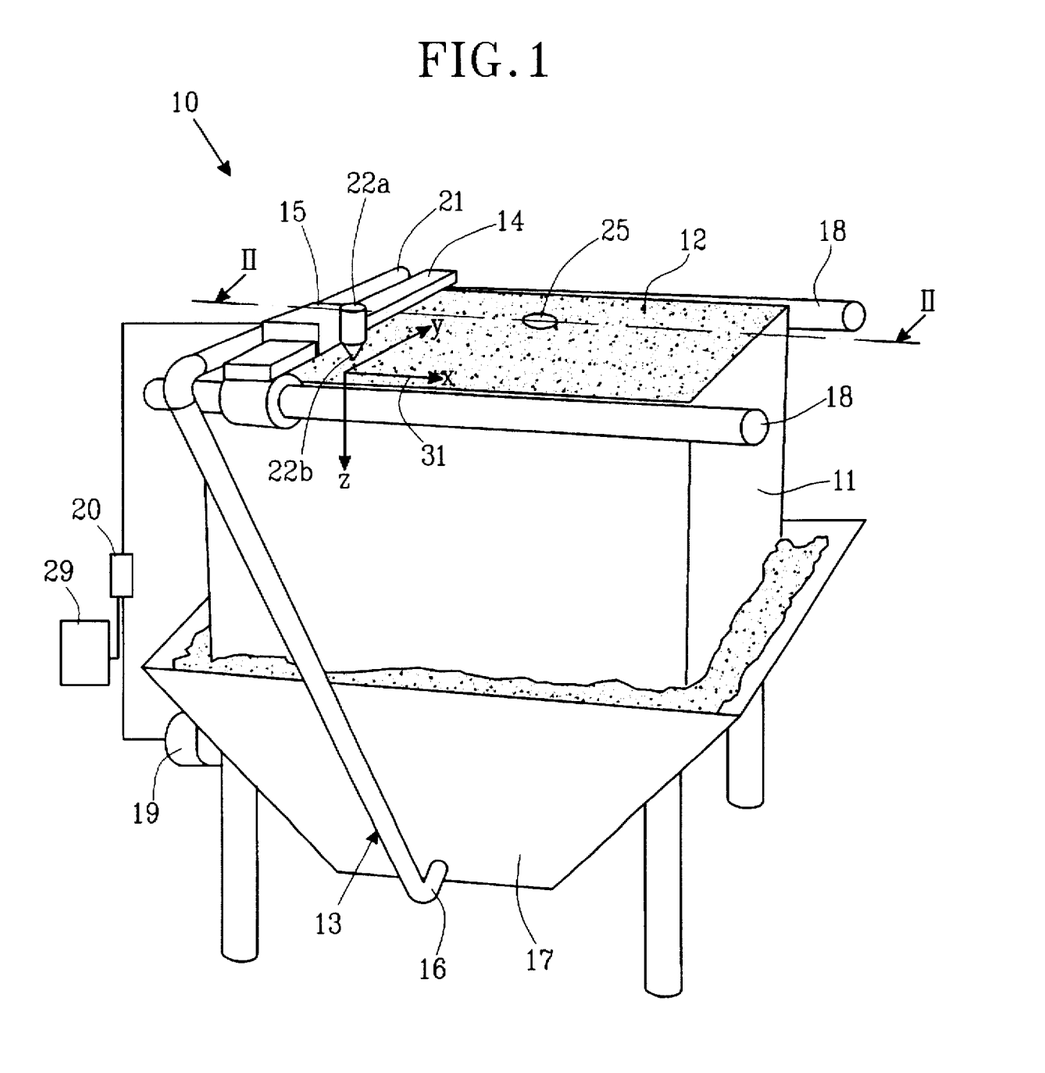
FIG. 1 is a perspective view of a device for producing three-dimensional bodies according to the invention.

The device 10 shown in FIG. 1 for manufacturing three-dimensional products comprises a container 11 opened at the top to be supplied with a powder material 12 through a recirculating means 13, a carriage 14 movable in the X-direction along guide-rails 18 over the container 11 and on which a carriage 15 movable in the Y-direction is arranged. The recirculating means 13 comprises a transporter 16, that transports the powder 12 from a collecting vat 17, which surrounds the lower part of the container 11, to a spreader 21. The latter is also movable along the upper edge 28 of the container, in the same way the carriage 15, displacable in the Y-direction, is. The spreader 21 may possibly be coupled to the carriage 15. A withdrawing ruler 26, which draws off superfluous powder material 12 in level with the upper edge of the container 11, is connected to the spreader.

A raisable and lowerable plate 23 is placed inside the container 11 and can be lowered via a lifting means 24 of a driving motor 19 from an upper top position, i.e. a start position just below the upper edge 28 of the container, to a lower bottom position, i.e. an end position, and vice versa. A control unit 20 controls the lowering of the plate 23, which corresponds to the thickness of a powder layer laid by the spreader. The lifting means can even be controlled through an hydraulic organ.

The carriage 15 displacable in the Y-direction supports an electrode means 22a with an electrode 22b, and the carriages 14 and 15 as well as the activation of the electrode means 22a are controlled by the control unit 20, in accordance with signals from a CAD-CAM-program in a computer 29.

The powder material 12 consists of an electrically conducting material, such as a metal powder/granulate, an electrically conducting plastic in powder or granulate form, or the like. The material can even contain non conducting constituents such as plastic, fibre, different kinds of powder or granulate, filling elements and so on, so that different characteristics can be obtained, such as reinforcement or formation of alloys after the connection, that for example can happen through sintering. Even electrically conducting, liquid materials, that harden when they are exposed to heat from the electrode, can be used.

When activating the electrode unit 22a, it is connected to a voltage source 40, while the electrically conducting material 12 is linked to the ground. Thereby, an electric arc appears between the electrode 22b situated just above the powder material 12 and the latter, which binds the material situated within the heat area, so that a delimited united part 25 is formed.

Functioning of the Invention

A simplified operation cycle of the method according to the invention will be described below with reference to FIGS. 2 to 4.

In a first stage (not shown), a first somewhat thicker powder layer 12 is supplied to the plate 23 situated in its topmost position in the container 11 to protect said plate. In connection with the spreading of the powder, any excess amount is wiped of f at the same time, and, if the powder material is not self-compressing, it is compressed by for example a press roll (not shown). The excess amount of powder is conveyed over the container side 28 and falls down in the collecting vat 17.

The press roll can also be used as a levelling means and/or a cooling means for the connected surface. Even a plate, a free-standing roll or the like can be arranged for levelling, compressing and/or cooling the medium. A liquid medium such as water can be used for cooling. Through compression, the porosity of the finished detail diminishes. By cooling, a difference of temperature is prevented in the first, respective the last layer.

Figure 2:
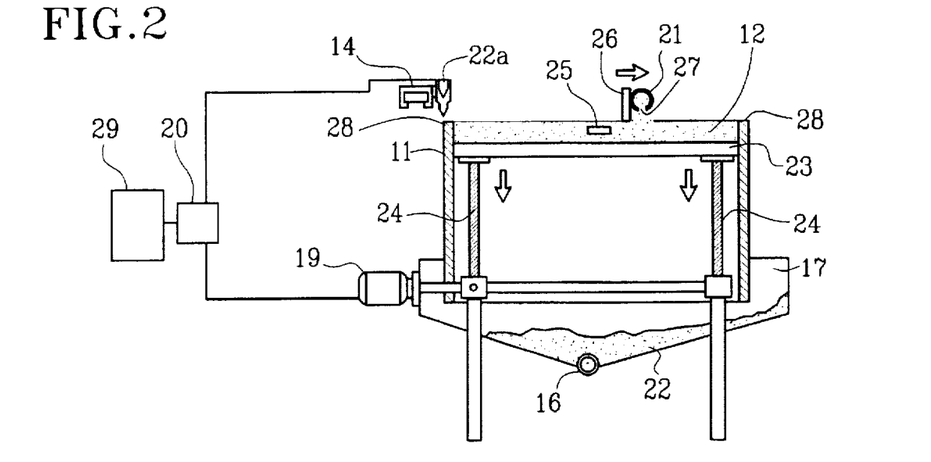
FIG. 2–4 are sectional views taken along line A—A of the device illustrated in FIG. 1 in three different manufacturing stages, a first beginning stage, a production stage and an end stage.

In the stage shown in FIG. 2, a first connected area 25 has been produced by the electrode means 22a, and a new powder layer is supplied through openings 27, provided in the spreader longitudinal direction. The wiping ruler 26 makes the powder layer even, so that the powder surface has an exact level. The surplus of powder which has been gathered in front of the ruler 26 is conveyed over the container edge 28 to the collecting vat 17, when the ruler passes the edge 28 on the way to its resting position.

Figure 3:
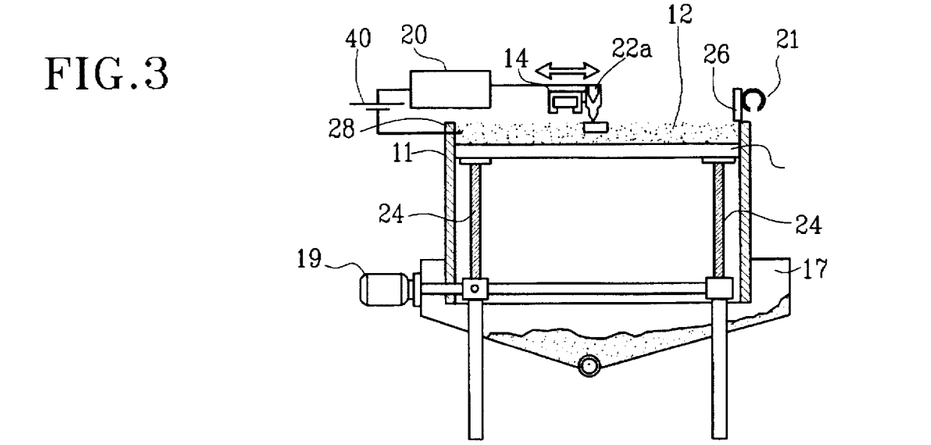
Figure 4:
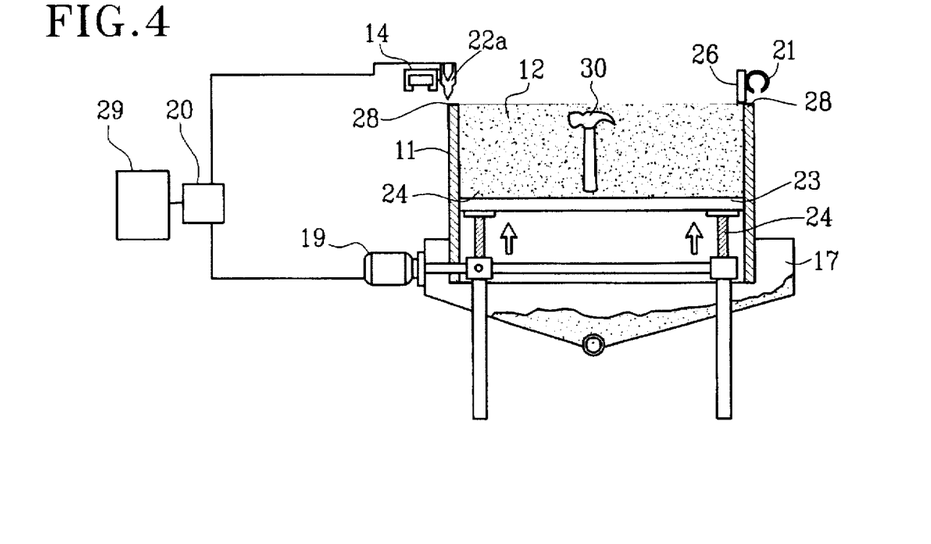

FIG. 3 shows the working moment, when the electrode means 22a is moving in the X- and/or Y-direction over the area that has to be sintered. By producing a potential difference, by means of a voltage source 40, between the electrically conducting powder material 12 and the electrode 22b, energy discharges in the form of, for example, electric arcs between the electrode 22b and the powder 12, are generated. The heat produced by the electric arc melts together the powder particles and merges that molten area with the molten area of a preceeding layer.

When using plastic powder, a sucking means (not shown) may be arranged to suck out eventual gases that are formed during the melting. The active area, i.e. where melting of the powder takes place, can preferably be set under vacuum or, when using metal powder, some kind of protective gas, for example argon (Ar), that produces a protective atmosphere. Gas can be supplied through openings provided on the electrode 22b or through mouthpieces placed near the carriage 15. The plate 23 can be perforated or made of a porous material, and let through the protective gas, that is conveyed under a light overpressure into the room 42 which is delimited by the plate's underside. The protective gas forces its way through the loose powder and comes up through the powder surface. Because of environmental consideration, the entire work area is preferably encapsulated.

A supply of powder and sintering of the powder take place a great number of times or until the desired body, for example a model 30, in this case a hammer, is completed. When the modelling is finnished, according to FIG. 4, the electrode 22b and the spreader 21 are placed in their resting positions. The plate 23 is raised so that all loose powder can be removed.

If a porous plate 23 has been used, a strong gas flow can be caused to pass through its open pores, so that the powder "is fluidized", at the same time as the bottom plate 23 is raised, and the excess powder flow over the edge and down to the collecting vat. The finished detail 30 is left, clean from powder.

The supply of powder and the levelling do not need to happen in separate stages, but can happen at the same time as the sintering. Powder is supplied and made level, by providing the spreader and the ruler on the carriage 14 in front of the electrode means 22a. When the carriage 14 moves in the X-direction in the system of coordinates 31, powder is supplied to the container and made level.

Figure 5:
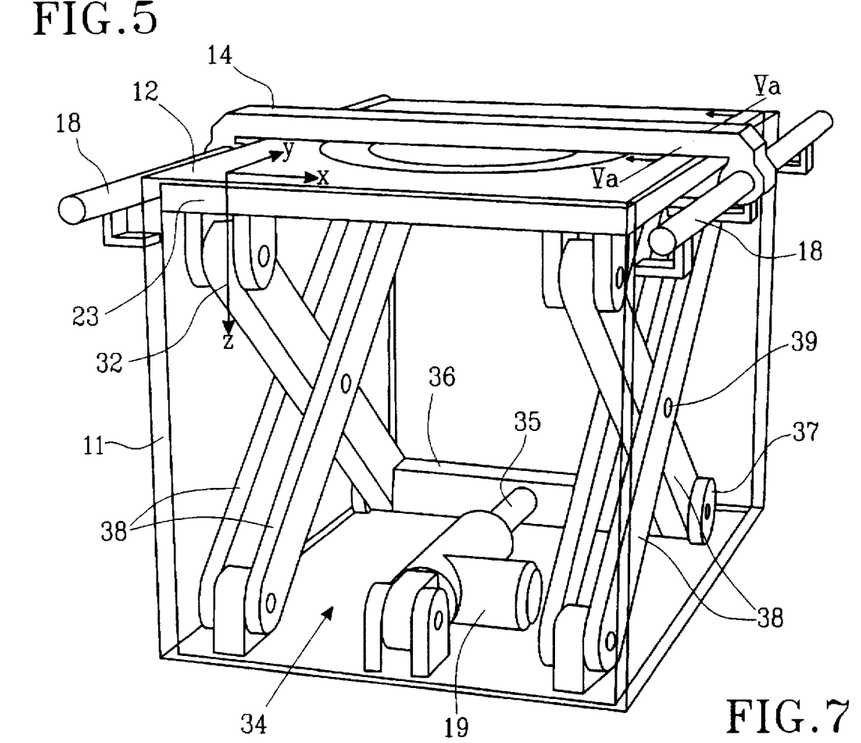
FIG. 5a is a perspective view of a modified device according to the invention.
FIG. 5b is an enlarged sectional view taken along line Vb—Vb in FIG. 5.

A faster modelling can be achieved by using an electrode means according to FIG. 5. On the electrode carriage 14, that preferably covers the whole longitudinal direction of the container, for example the Y-direction, an electrode comb 41 is arranged, that comprises a number of individually controlled fixed electrodes 22c organized in slanted columns, according to FIG. 6 and 7, so that for example an electrode $22c_3$ covers the interval between two electrodes $22c_2$ and $22c_4$. The carriage 14 is moved on the rails 18, in the X-direction, according to the system of coordinates 31, and the electrodes operates so that a whole area 25 is sintered at the same time. Supply and levelling of powder can be done by the carriage 14, on the way forward and/or backward along the X-direction.

The carriage 14 can be detachable, so that carriages with different number of electrodes and sizes can be used.

Figure 5A:
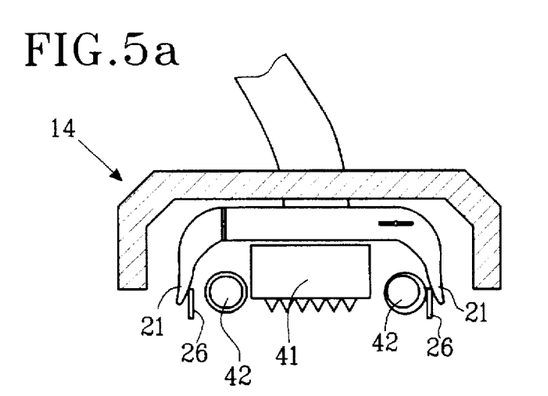

According to FIG. 5a, the lifting means 24, shown in FIG. 1–4, has been replaced with another, so called claw lift 34. A motor 19 drives a threaded spindle 35, that moves a carriage 36 with wheel 37. The movement causes the linking arms 38 to swing around the shafts 39, and raises or lowers the plate 23 in the container 11. A collecting vat can be arranged around the container 11 even in this embodiment.

In this embodiment, such as it appears in FIG. 5b, two spreaders 21 are provided on the carriage 14, one on each side of the electrode comb 41. An organ 42 for compressing the medium 12 is further provided, as an example in the form of rollers. With this equipment, it is possible, during the forward as well as the backward motions of the carriage, to spread, wipe, compress, cool down and/or treat with heat the medium.

Figure 6:
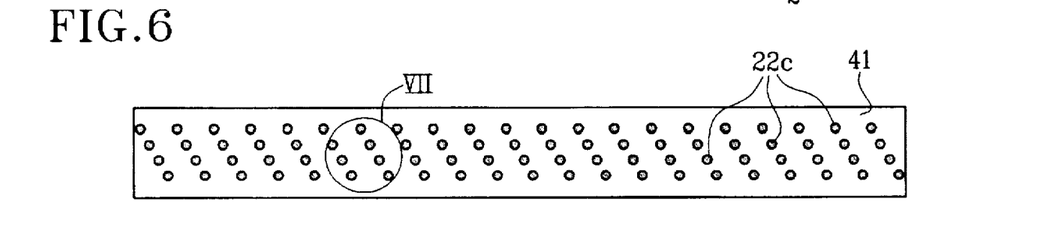
FIG. 6 shows an embodiment of an electrode means.
Figure 7:
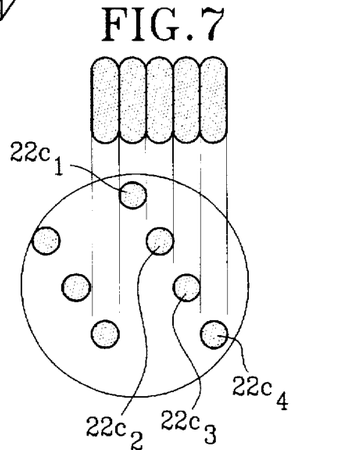
FIG. 7 is a magnified view of a part of the electrode means shown in FIG. 6.

In FIG. 6 and 7, the electrode comb 41 and the way the electrodes 22b are placed in slanted columns and parallel rows, to get a dot density as big as possible, are shown.

Figure 8:
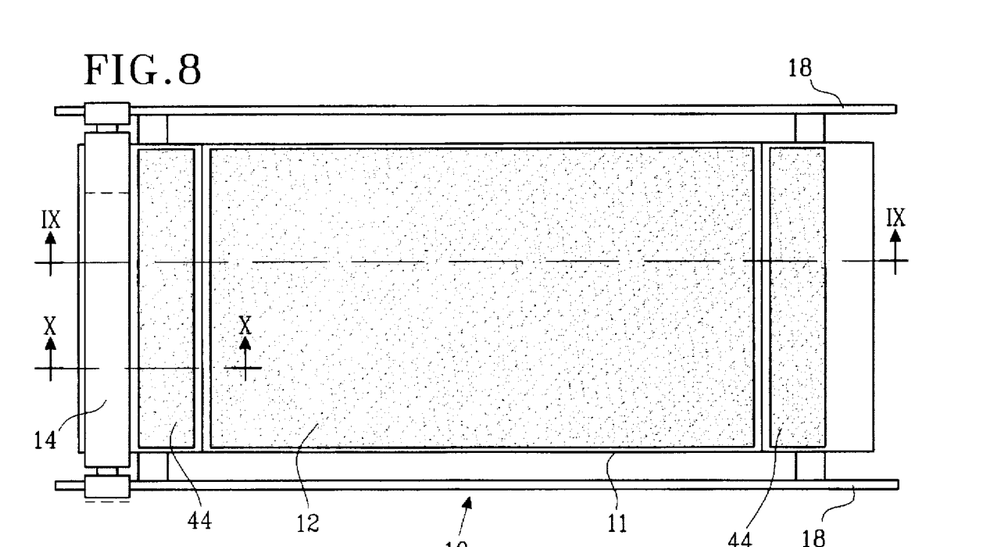
FIG. 8 is a top view of another embodiment of the invention.
Figure 9:
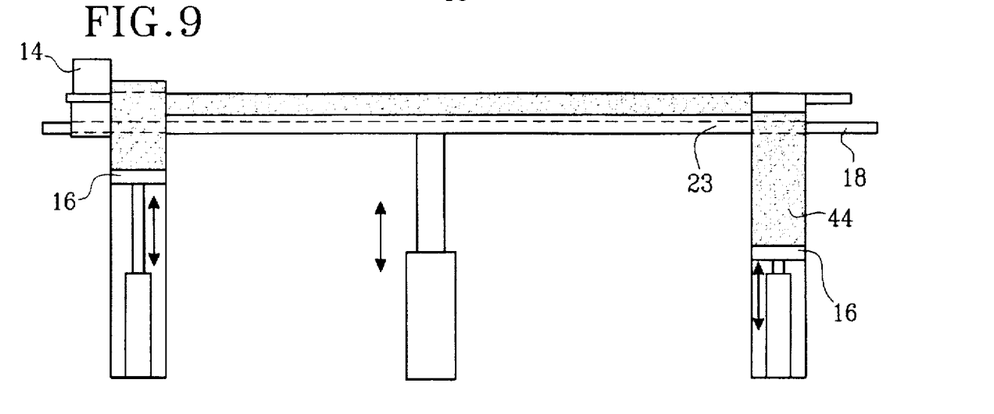
FIG. 9 is a sectional view taken along line IX—IX in FIG. 8.
Figure 10:
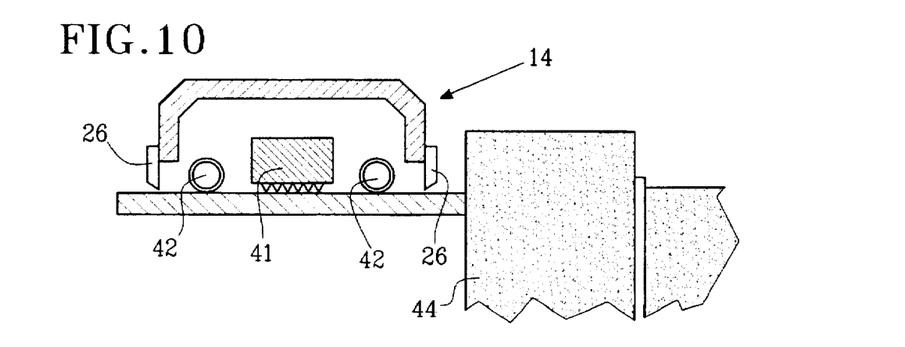
FIG. 10 is an enlarged sectional view taken along line X—X in FIG. 8.

An additional embodiment is shown in FIG. 8, 9 and 10, that differs from the rest by the medium 12 not being spread from above, but being fed up from two feeding ducts 44 provided one on each opposite side of the container and having their feeding openings in level with the upper edge 28 of the container. With the help of suitable transporters 16, for example pistons, the medium is pressed up through the actual feeding duct 44, so that the medium gushes out in front of the carriage 14 placed in its parking position. By displacing the carriage 14, the medium will be spread above the entire opening of the container, compressed by the press rolls 42 and excess material will be pushed down into the opposite feeding duct 44, where the level of powder has been lowered together with the piston that has been driven to a fetch position. Below the container, conveying screws (not shown) or the like, that feeds the powder sideways to the pistons, are preferably provided. The remaining excess material, which is gathered in the feeding duct, can be reused, the transporter 16 being lifted again in front of the carriage 14.

Figure 11:
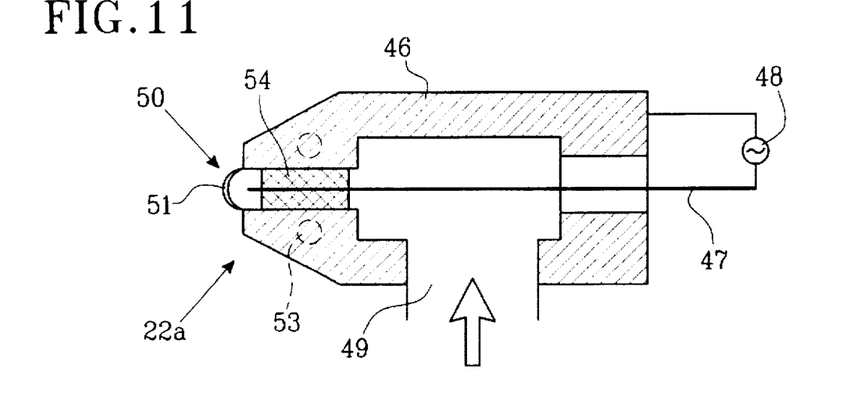
FIG. 11 shows an embodiment of a plasma electrode means.
Figure 12:
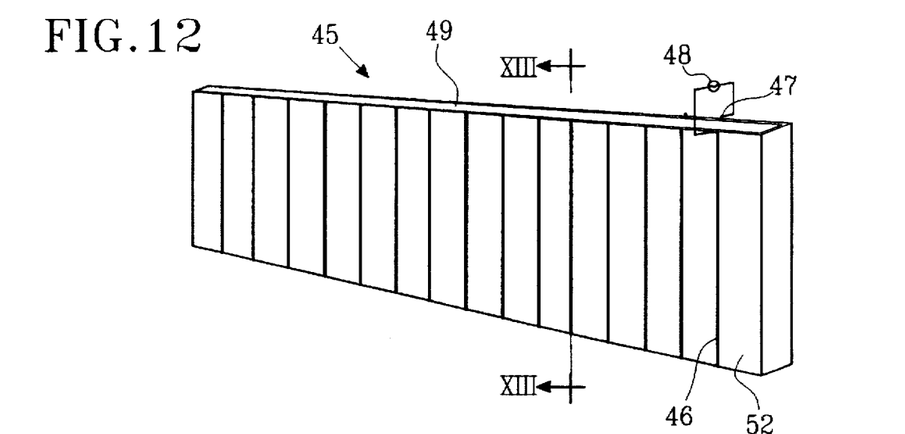
FIG. 12 shows another embodiment of a plasma electrode means.
Figure 13:
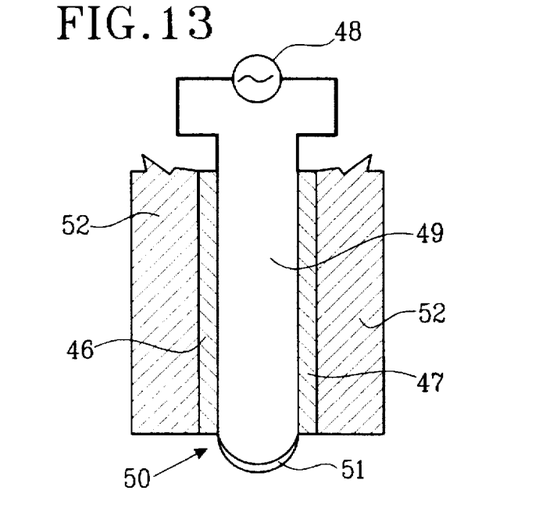
FIG. 13 is a sectional view of the means shown in FIG. 12.

When using non conducting material, the embodiments according to FIG. 11–13 can be used. The electrode device 22a consists in this case of a so called plasma electrode, plasma sprayer or micro-plasma, that generates heat and connects the medium particles.

The plasma electrode 45 comprises at least two electrodes 46, 47 detached from each other, and connected to at least a voltage source 48. Between the electrodes, a duct 49 is arranged for supplying a gas.

The electrodes are set in contact with different potentials through the voltage source 48, whereby an electrical field is generated between the electrodes 46, 47. When the gas, preferably a rare gas, such as Argon (Ar), passes by the field, the gas is ionized, plasma is formed and heat is generated.

The electrodes 46 and 47 can be separated by means of a porous spacing means 54, which ensures a controlled distance between the electrodes. Cooling ducts 53 can be arranged in or by the electrode for cooling down the electrode, for example using water or the like. Even the same gas flow through the electrode can be used for cooling the electrode.

One or more electrodes as above can be used in a device according to the invention. An other embodiment of a plasma electrode is shown in the FIGS. 12 and 13. Thin electrodes 46 and 47, for example of a heatproof metal, such as tungsten, are arranged on an electrically insulated material 52. Pair of electrodes 46, 47 are separated by a gas duct 49. The electrodes 46 and 47 can be connected to driving circuits (not shown). The electrode carrier 52 can be arranged as an insert card, for connection to the driving circuits and is exchanged because of wear, form change or the like. Such an electrode unit 45 is moved over the surface of the medium. By igniting certain pairs of electrodes, plasma is produced, whereby desired points on the medium are connected.

The electrodes can sweep over the medium with X/Y motion or only with motion along one axis. The electrodes, of the comb electrode type, can be multiplexed between different, parallel cards, which are slantingly shifted to increase the resolution.

The invention is naturally not restricted to the shown embodiments, but a number of variants and combinations are conceivable within the scope of the claims.

List of Reference Numerals

10 Device
11 Container
12 Medium, for example powder material
13 Recirculating means
14 Vehicle movable in the x-direction
15 Vehicle movable in the y-direction
16 Transporter
17 Collecting vat
18 Guide-rails
19 Driving motor
20 Control unit
21 Spreader
22a Energy producing means/electrode means
22b Electrode
23 Plate
24 Lifting means
25 Chosen areas of connected material
26 Wiping ruler
27 Openings in the spreader
28 Upper edge of the container
29 Computer
30 Body, model
31 System of coordinates
34 Claw lift
35 Threaded spindle
36 Lifting carriage
37 Wheel
38 Connecting arms
39 Shafts
40 Voltage source
41 Electrode comb
42 Room
43 Compressing means for example rolls
44 Feeding ducts
45 Electrode means
46 Electrode
47 Electrode
48 Voltage source
49 Duct
50 Burning point
51 Plasma-arc
52 Isolation/carrier
53 Cooling duct
54 Spacing means

I claim:

1. Method for creating a three-dimensional body from a material comprising particles, by means of an energy producing device, by producing a number of cross-sectional layers, each representing cross-sectional layers of the body, said device being arranged to move across the particles, whereby particles in determined areas in an uppermost layer are attached to each other or each other and to a preceding layer in accordance with signals from a control unit, while particles that are not connected in respective layers are removed, wherein the method comprises the steps of:
   connecting said energy producing device comprising at least one electrode to an energy source to form a first pole in a circuit; and
   connecting said material to said energy source to form a second pole in said circuit and generate energy between said electrode and said material, for melting particles of said material by changing physical characteristics of said particles in said determined areas.

2. The method according to claim 1, wherein the produced energy is an electric arc or heat.

3. The method according to claim 1, wherein the method further comprises the steps of:
   moving said electrode at some distance across said material, so that a topmost layer of said material is processed by connection through melting in said determined areas in accordance with signals from a control unit;

lowering said topmost layer and supplying a new material layer above said processed material layer;

levelling said supplied material layer; and connecting said supplied material layer in the determined areas with area(s) connected in the preceding material layer.

4. A device for creating a three-dimensional body from a material comprising particles, by means of an energy producing device, by producing a number of cross-sectional layers, each representing cross-sectional layers of the body, said device being arranged to move across the particles, whereby particles in determined areas in an uppermost layer are attached to each other or each other and to a preceding layer in accordance with signals from a control unit, while particles that are not connected in respective layers are removed, wherein said device comprises:

at least one electrode;

a container for receiving said material particles;

a vertically adjustable supporting plate on which said material particles are provided;

an elevator arrangement for adjusting said supporting plate;

an energy source connected to said electrode and said material, so that the electrode and said material form antipoles in an electrical circuit;

said material having an electrically conducting or semi-conducting material; and said electrode being operationally arranged to produce energy to connect the material particles in the determined areas, in accordance with signals from a control unit.

5. The device according to claim 4, wherein said material at least partly comprises an electrically conducting material, in powder, fibre or granulate form.

6. The device according to claim 5, wherein said material also contains a material for reinforcement fillings, colouring, gas development or forming an alloy after the melting.

7. The device according to claim 4, wherein said electrode is arranged to operate in a controlled atmosphere.

8. The device according to claim 7, wherein said electrode is arranged with openings or mouthpieces to produce said controlled atmosphere.

9. The device according to claim 7, wherein a carriage supporting the electrode is arranged to produce said controlled atmosphere.

10. The device according to claim 4, wherein said electrode is of a kind that produces resistance welding or electric arc welding.

11. The device according to claim 4, wherein said container is open at top and bottom ends and in a lower part is equipped with a collecting vat having an opening larger than a top opening of said container.

12. The device according to claim 4, wherein said supporting plate is perforated or made of a porous material with open pores and underside of said supporting plate can be set under pressure so that loose material particles on the supporting plate can be fluidized.

13. The device according to claim 4, wherein a plurality of electrodes are provided on an electrode comb arranged to extend movably in one direction above said material.

14. The device according to claim 13, wherein said electrodes are connected to a multiplexing control unit.

15. The device according to claim 4, wherein at least one material duct is arranged on one side of said container, for collecting or outputting said material, said duct having openings for input and output, respectively, arranged on a level with said container opening, and that a conveyor is provided in said duct to receive and feed said material, respectively.

16. The device according to claim 4, wherein a unit is arranged for cooling or compressing said processed material layer before a new layer of material is processed.

17. The device according to claim 16, wherein said unit comprises a roll or a plate.

18. The device according to claim 16, wherein said cooling unit uses a liquid medium.

19. The device according to claim 18, wherein said liquid medium is water.

20. The device according to claim 4, wherein the elevator arrangement is a hydraulic device.

21. The device according to claim 4, wherein said electrode is arranged to be slantingly displaced over said material.

22. A device for creating a three-dimensional body from a material comprising particles, comprising:

an energy producing device for producing a number of cross-sectional layers, each representing a cross-sectional layer of the body to be manufactured, said device being arranged to move across the particles, whereby particles in determined areas in an uppermost layer are attached to each other or each other and to a preceding layer in accordance with signals from a control unit, while particles that are not connected in respective layers are removed, said energy producing device comprising at least one electrode which comprises at least two conductors, which can be connected to at least one voltage source;

ducts for supplying gas to a heating area, said energy producing device being arranged with the ducts, said gas forming a plasma through contact with an electric arc produced by said energy producing device; and said material comprising material particles that changes physical characteristic of the material in contact with the heat produced by said plasma, whereby said material particles are melt and connected in determined areas, in accordance with signals from a control unit, said device further comprising material supporting plate and an elevator arrangement for vertically displacing said supporting plate after processing a layer of said material and displacing said material in correspondence to a thickness of processed layer thickness.

23. The device according to claim 22, wherein said material also contains a material for filling reinforcement, colouring, gas development or forming an alloy after the melting.

24. The device according to claim 22, wherein said container is open at top and bottom and in a lower part is equipped with a collecting vat having an opening larger than a top opening of said container.

25. The device according to claim 22, wherein said supporting plate is perforated or made of a porous material with open pores and the underside of said supporting plate can be set under pressure so that loose powder material on the supporting plate can be fluidized.

26. The device according to claim 22, wherein a plurality of electrodes are provided on an electrode carrier, arranged to extend above said open top of the container, said electrode carrier being movable in at least one direction across said material, and arranged with ducts to supply a gas.

27. The device according to claim 22,wherein at least one material duct is arranged on one side of said container, for collecting outputting of said material, said duct having openings for input and output, respectively, which is arranged on a level with said container opening, and that a conveyor is provided in said duct to receive and feed said material, respectively.

28. The device according to claim 22, wherein a unit is arranged for cooling or compressing said processed material layer before a new layer of material is processed.

29. The device according to claim 28, wherein said unit comprises a roll or a plate.

30. The device according to claim 28, wherein said cooling unit uses a liquid medium.

31. The device according to claim 22, wherein the elevator arrangement is a hydraulic device.

32. The device according to claim 22, wherein said electrode is arranged to be slantingly displaced across said material.

* * * * *